United States Patent
Kimura

(10) Patent No.: US 9,600,326 B2
(45) Date of Patent: Mar. 21, 2017

(54) INFORMATION PROCESSING TERMINAL

(71) Applicant: DENSO CORPORATION, Kariya, Aichi-pref. (JP)

(72) Inventor: Yousuke Kimura, Nagoya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/435,781

(22) PCT Filed: Sep. 23, 2013

(86) PCT No.: PCT/JP2013/005602
§ 371 (c)(1),
(2) Date: Apr. 15, 2015

(87) PCT Pub. No.: WO2014/061203
PCT Pub. Date: Apr. 24, 2014

(65) Prior Publication Data
US 2015/0293781 A1 Oct. 15, 2015

(30) Foreign Application Priority Data
Oct. 19, 2012 (JP) .................................. 2012-231734

(51) Int. Cl.
G06F 9/46 (2006.01)
G06F 9/48 (2006.01)
(Continued)

(52) U.S. Cl.
CPC ......... *G06F 9/4843* (2013.01); *G01C 21/362* (2013.01); *G06F 3/048* (2013.01); *G06F 9/52* (2013.01); *G06F 21/44* (2013.01)

(58) Field of Classification Search
None
See application file for complete search history.

(56) References Cited

U.S. PATENT DOCUMENTS 5,212,771 A * 5/1993 Gane ...................... G06Q 10/10
700/8
5,557,729 A * 9/1996 Frean .................... G06F 9/4446
715/803
(Continued)

FOREIGN PATENT DOCUMENTS

DE 102011105066 A1 12/2011
JP 2007304333 A 11/2007
(Continued)

OTHER PUBLICATIONS

International Search Report and Written Opinion (in Japanese with English Translation) for PCT/JP2013/005602, mailed Dec. 3, 2013; ISA/JP.

*Primary Examiner* — Hiren Patel
(74) *Attorney, Agent, or Firm* — Harness, Dickey & Pierce, P.L.C.

(57) ABSTRACT

An information processing terminal including an application execution portion, a sub-application execution portion and a hidden screen display portion is provided. The application execution portion executes an application. The sub-application execution portion executes a sub-application in response to an execution request from the application execution portion. The sub-application is configured to provide a specified function for the application executed by the application execution portion. The hidden screen display portion, instead of displaying an execution screen indicating execution of the sub-application, displays a hidden screen hiding the execution of the sub-application while the sub-application execution portion is executing the sub-application.

4 Claims, 8 Drawing Sheets

(51) Int. Cl.
*G06F 3/048* (2013.01)
*G06F 21/44* (2013.01)
*G01C 21/36* (2006.01)
*G06F 9/52* (2006.01)

(56) References Cited

U.S. PATENT DOCUMENTS

| | | | | |
|---|---|---|---|---|
| 5,634,102 A * | 5/1997 | Capps | G06F 9/4443 | 713/100 |
| 6,603,492 B1 * | 8/2003 | Sakaguchi | G06F 9/4443 | 715/781 |
| 6,762,772 B1 * | 7/2004 | Imamura | G01C 21/367 | 340/988 |
| 7,228,225 B1 * | 6/2007 | Walters | G01C 21/26 | 701/431 |
| 7,257,819 B1 * | 8/2007 | Dixon, III | G06F 9/542 | 719/311 |
| 7,561,966 B2 * | 7/2009 | Nakamura | G01C 21/365 | 340/461 |
| 8,285,472 B2 * | 10/2012 | Sasano | G01C 21/3415 | 340/995.19 |
| 8,478,307 B1 * | 7/2013 | Hayes | H04W 4/025 | 455/456.6 |
| 8,775,071 B2 * | 7/2014 | Achthoven | G01C 21/3638 | 701/426 |
| 8,819,581 B2 * | 8/2014 | Nakamura | G01C 21/3664 | 701/1 |
| 2001/0002455 A1 * | 5/2001 | Uekawa | G01C 21/26 | 701/520 |
| 2003/0076362 A1 * | 4/2003 | Terada | G06F 3/0486 | 715/781 |
| 2003/0221093 A1 * | 11/2003 | Touchet | G06F 9/4401 | 713/1 |
| 2005/0223341 A1 * | 10/2005 | Repka | G06F 3/0481 | 715/851 |
| 2006/0020373 A1 * | 1/2006 | Abe | G01C 21/3679 | 701/1 |
| 2007/0067097 A1 * | 3/2007 | Haatainen | G01C 21/3626 | 701/532 |
| 2007/0109278 A1 * | 5/2007 | Moon | G06F 1/1624 | 345/175 |
| 2009/0073129 A1 * | 3/2009 | Sirotich | G06F 3/0428 | 345/173 |
| 2009/0083847 A1 | 3/2009 | Fadell et al. | | |
| 2009/0171564 A1 * | 7/2009 | Wu | G01C 21/3647 | 701/533 |
| 2009/0171574 A1 * | 7/2009 | Ishibashi | G01C 21/343 | 701/533 |
| 2010/0030460 A1 * | 2/2010 | Sawai | G01C 21/32 | 701/532 |
| 2010/0100842 A1 * | 4/2010 | Kim | G06F 3/04886 | 715/808 |
| 2010/0114476 A1 * | 5/2010 | Hsu | G01C 21/3682 | 701/533 |
| 2011/0083137 A1 | 4/2011 | Kashioka | | |
| 2011/0123173 A1 * | 5/2011 | Ruffini | G06Q 30/02 | 386/249 |
| 2011/0210914 A1 * | 9/2011 | Kitagawa | G06F 3/016 | 345/157 |
| 2012/0254804 A1 * | 10/2012 | Sheha | G06Q 30/02 | 715/834 |
| 2012/0329520 A1 * | 12/2012 | Akama | G01C 21/3688 | 455/557 |
| 2013/0054131 A1 * | 2/2013 | Zhang | G01C 21/3446 | 701/410 |
| 2013/0120405 A1 * | 5/2013 | Maloney | G06T 13/00 | 345/474 |
| 2013/0191713 A1 * | 7/2013 | Porras Luraschi | G06F 17/30902 | 715/221 |
| 2013/0245944 A1 * | 9/2013 | Rutten | G01C 21/36 | 701/533 |
| 2014/0012494 A1 * | 1/2014 | Cudak | G01C 21/3415 | 701/412 |
| 2014/0280580 A1 * | 9/2014 | Langlois | H04W 4/005 | 709/204 |

FOREIGN PATENT DOCUMENTS

| | | |
|---|---|---|
| JP | 2008197885 A | 8/2008 |
| JP | 2009135705 A | 6/2009 |
| JP | 2009217558 A | 9/2009 |
| JP | 2011061366 A | 3/2011 |
| JP | 2011076550 A | 4/2011 |
| JP | 2012099091 A | 5/2012 |

\* cited by examiner

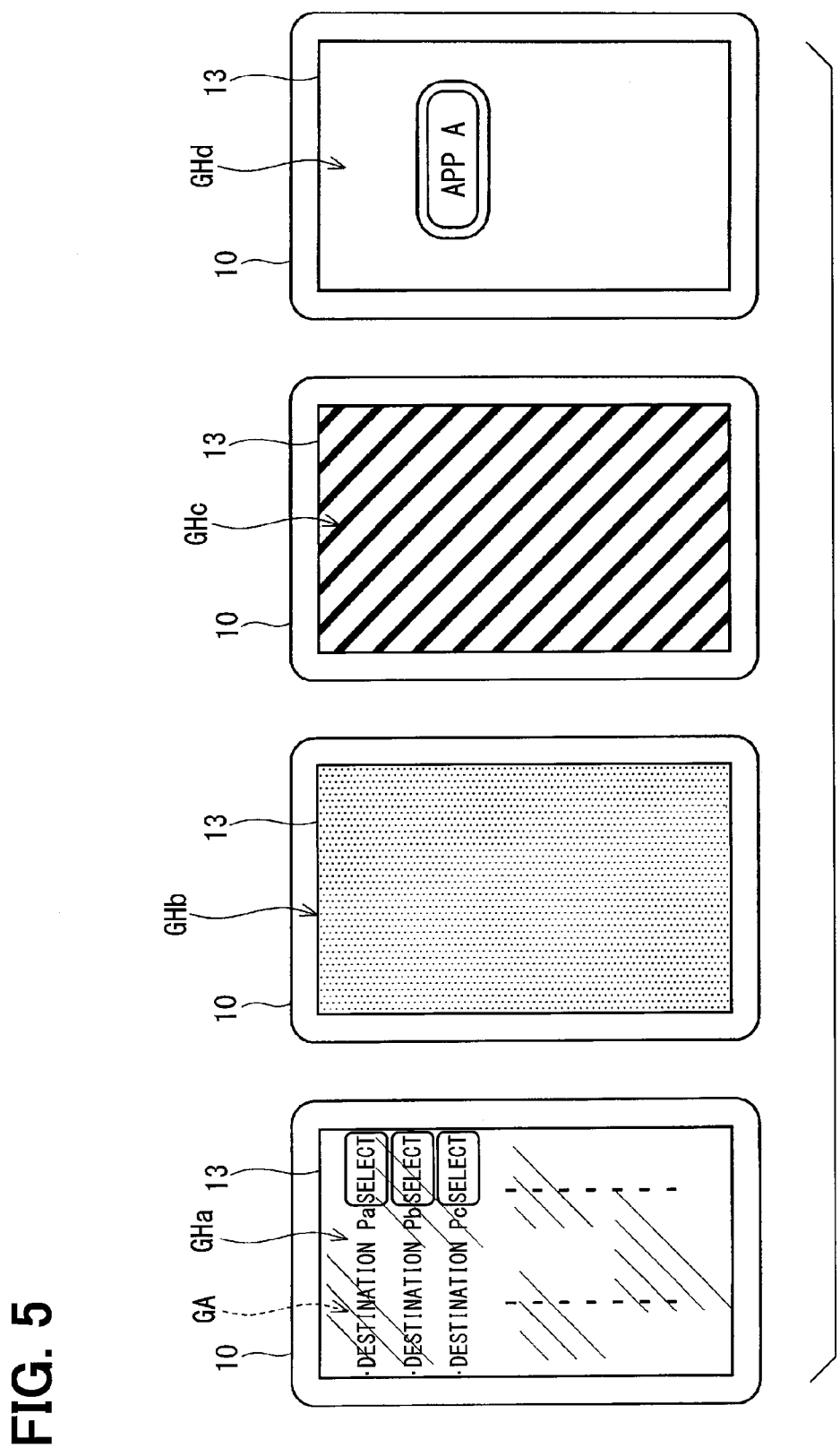

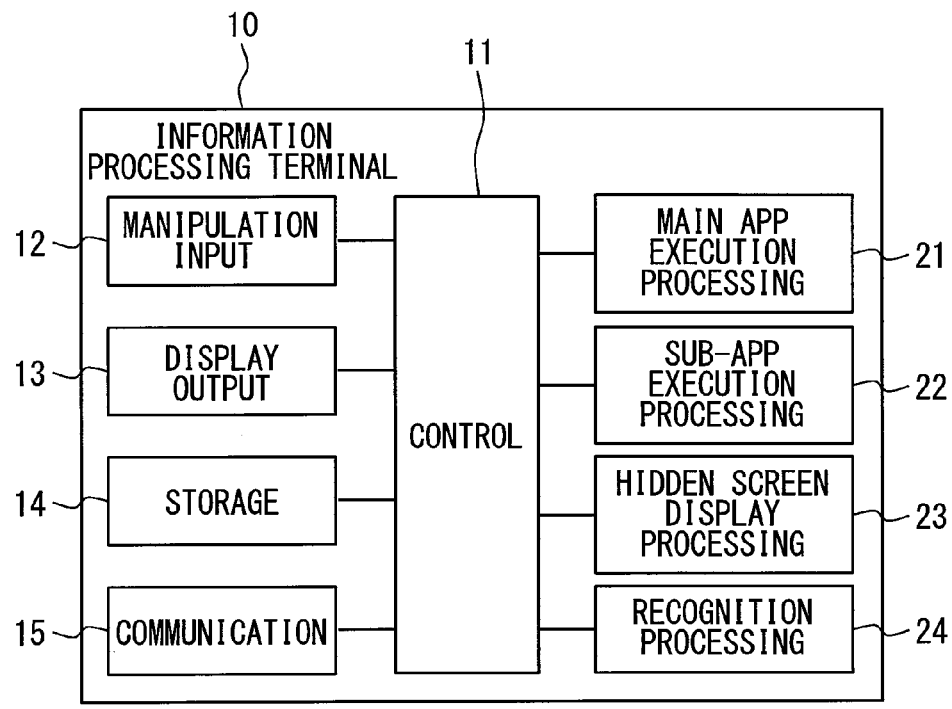

INFORMATION PROCESSING TERMINAL

CROSS REFERENCE TO RELATED APPLICATIONS

This application is a U.S. National Phase Application under 35 U.S.C. 371 of International Application No. PCT/JP2013/005602 filed on Sep. 23, 2013 and published in Japanese as WO 2014/061203 A1 on Apr. 24, 2014. This application is based on and claims the benefit of priority from Japanese Patent Application No. 2012-231734 filed on Oct. 19, 2012. The entire disclosures of all of the above applications are incorporated herein by reference.

TECHNICAL FIELD

The present disclosure relates to an information processing terminal.

BACKGROUND ART

For example, patent document 1 discloses the technology that allows several applications to cooperate with each other. While one application is executing, for example, the technology executes another application that provides a function not provided for the one application. The technology can thereby indirectly incorporate a function that is not originally provided for the one application.

PRIOR ART LITERATURES

Patent Literature

Patent Literature 1: JP-2008-197885A

SUMMARY OF INVENTION

Suppose that an application (hereinafter referred to as a "main app") is executed and then another application (hereinafter referred to as a "sub-app") is executed concurrently. In such case, a screen displayed on an information processing terminal generally transitions from an execution screen of the main app to an execution screen of the sub-app. When the sub-app is completed, the screen displayed on the information processing terminal transitions to the execution screen of the main app again. According to the configuration that allows the display screen to transition, a user recognizes that the main app pauses and the sub-app is operating, namely, the sub-app different from the main app is operating. This cannot give the appearance of directly including a function of the sub-app in the main app.

The main app may be directly installed with a sub-app function as a module, for example. In such case, the sub-app function is provided as a function of the main app while the main app is executed. When a sub-app function is provided, it is possible to reduce the possibility of allowing a user to recognize that a sub-app different from the main app is operating. However, this technique requires a process to install the sub-app function in the main app and this process is a load on application developers. Therefore, in the technology for providing a function originally unavailable for the main app by executing a sub-app different from the main app, not by directly installing a sub-app function in the main app, it is required that the main app appear to be indirectly installed with a sub-app function.

The present disclosure concerns a technology of providing a main application with a function not originally included in the main application by executing a sub-application different from the main application and provides an information processing terminal that can prevent the sub-application from being recognized as being explicitly active and that can give the main application the appearance of being directly installed with a sub-application function.

An information processing terminal according to an example of the present disclosure comprises an application execution portion, a sub-application execution portion and a hidden screen display portion. The application execution portion executes an application. The sub-application execution portion executes a sub-application in response to an execution request from the application execution portion, the sub-application being configured to provide a specified function for the application executed by the application execution portion. The hidden screen display portion, instead of displaying an execution screen indicating execution of the sub-application, displays a hidden screen hiding the execution of the sub-application while the sub-application execution portion is executing the sub-application.

The above information processing terminal can execute a sub-application different from the main application to provide a function not originally included in the main application and meanwhile display the hidden screen to prevent a user from recognizing that the sub-application is active. The information processing terminal can provide a function not originally included in the main application and concurrently hide that the sub-application to provide the function is active. The information processing terminal can provide the function as if the function were included in the main application. The information processing terminal can give the appearance of directly installing the sub-application function in the main application.

BRIEF DESCRIPTION OF DRAWINGS

The above and other objects, features and advantages of the present disclosure ill become more apparent from the below detailed description given with reference to the accompanying drawings in which:

FIG. 5 is a diagram illustrating hidden screens GHa through GHd;

FIG. 6 is a function block diagram schematically illustrating a configuration of an information processing terminal according to a second embodiment;

FIG. 7 is a diagram illustrating authentication data;

EMBODIMENTS FOR CARRYING OUT INVENTION

Figure 1:
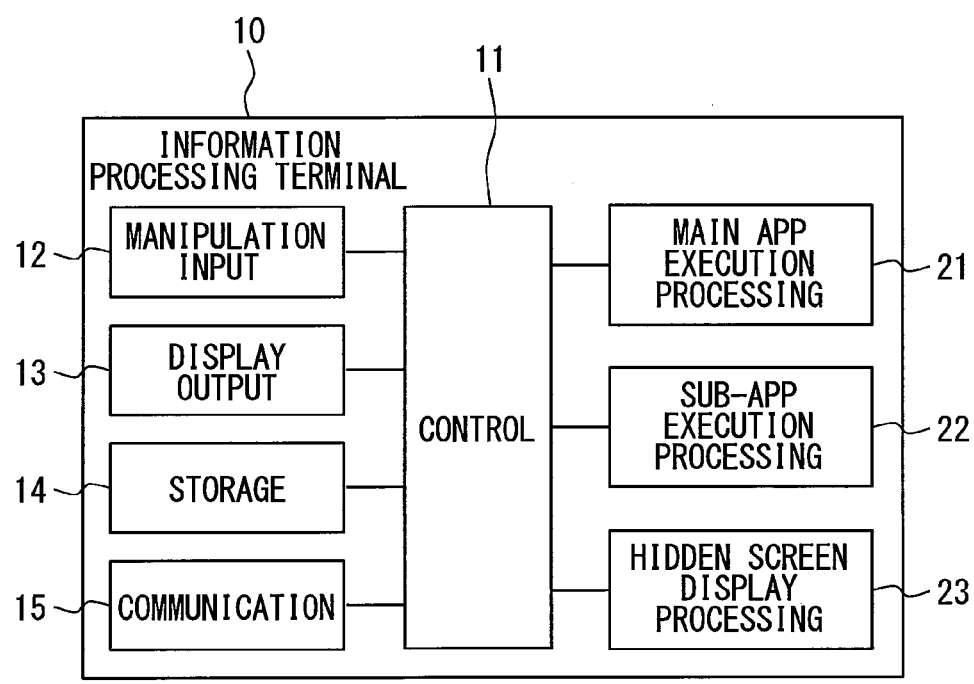
FIG. 1 is a function block diagram schematically illustrating a configuration of an information processing terminal according to a first embodiment.

Embodiments of the information processing terminal will be described with reference to the accompanying drawings.

In the embodiments, the same parts or components are depicted by the same reference numerals and a detailed description is omitted for simplicity.

First Embodiment

As illustrated in FIG. 1, an information processing terminal 10 is configured as a mobile telephone, for example, and includes a control portion 11, a manipulation input portion 12, a display output portion 13, a storage portion 14, and a communication portion 15.

The control portion 11 is mainly configured as a microcomputer including a CPU, ROM, and RAM (not shown). The control portion 11 controls overall operations of the information processing terminal 10. The control portion 11 executes a control program in the CPU to virtually implement a main application execution processing portion 21 (hereinafter referred to as a "main execution processing portion 21"), a sub-application execution processing portion 22 (hereinafter referred to as a "sub-execution processing portion 22"), and a hidden screen display processing portion 23 as software. The main execution processing portion 21, the sub-execution processing portion 22, and the hidden screen display processing portion 23 may be implemented as hardware circuits integrated with the control portion 11, for example.

The manipulation input portion 12 includes various types of switches such as a touch panel switch provided on a screen of the display output portion 13 and a mechanical switch provided around the display output portion 13. The manipulation input portion 12 outputs a manipulation detection signal to the control portion 11 in response to user's manipulation on various switches. The control portion 11 analyzes the manipulation detection signal supplied from the manipulation input portion 12 to identify a content of the user's manipulation. Based on the identified manipulation content, the control portion 11 performs various processes such as executing an application specified by the user, for example.

The display output portion 13 is configured as a liquid crystal display instrument or an organic EL display instrument and displays various types of information based on a display instruction signal supplied from the control portion 11. The screen of the display output portion 13 is provided with a touch panel according to the known pressure sensitive type, electromagnetic induction type, capacitance type, or a combination of these types. The display output portion 13 displays execution screens for various types of applications such as a hidden screen to be described later.

The storage portion 14 includes a nonvolatile storage medium such as a hard disk drive or a memory card. The storage portion 14 stores various types of computer programs, an application program to execute various types of applications, data used for the programs, various types of screen display data, and map data. The various types of applications (application programs) are each provided with identification information to identify the application. The map data contains at least position information (coordinate information) to indicate positions of stores, facilities, geographical names, and tourist sites to be specified as destinations.

The communication portion 15 establishes a wireless communication line with an unshown external navigation system to provide vehicular route guidance, for example, and performs various types of communications with the navigation system using the communication line. The communication portion 15 may communicably connect with an information processing terminal different from the information processing terminal 10 as an external apparatus other than the navigation system.

The main execution processing portion 21 corresponds to an example of an application execution portion and means. The main execution processing portion 21 executes a requested application to be executed as the main application based on an execution request from the control portion 11. The main application executed by the main execution processing portion 21 may include a destination selection application to be described later. The destination selection application selects a point to be specified as a destination for vehicular route guidance, for example.

The sub-execution processing portion 22 corresponds to an example of a sub-application execution portion and means. According to an execution request from the main execution processing portion 21, the sub-execution processing portion 22 executes a sub-application that supplies a specified function to the main application executed by the main execution processing portion 21. Executing the sub-application supplies the main application with a function that is not originally included in the main application. The sub-application executed by the sub-execution processing portion 22 may include a position information provision application to be described layer. The position information provision application implements a specified function that extracts position information (coordinate information) selected by the destination selection application from the map data and supplies the extracted position information to a navigation system via the communication portion 15.

The hidden screen display processing portion 23 corresponds to an example of a hidden screen display portion and means. While the sub-execution processing portion 22 is executing a sub-application, the hidden screen display processing portion 23 displays a hidden screen instead of an execution screen indicating that the sub-application is active. The hidden screen hides the sub-application being active.

Figure 2:
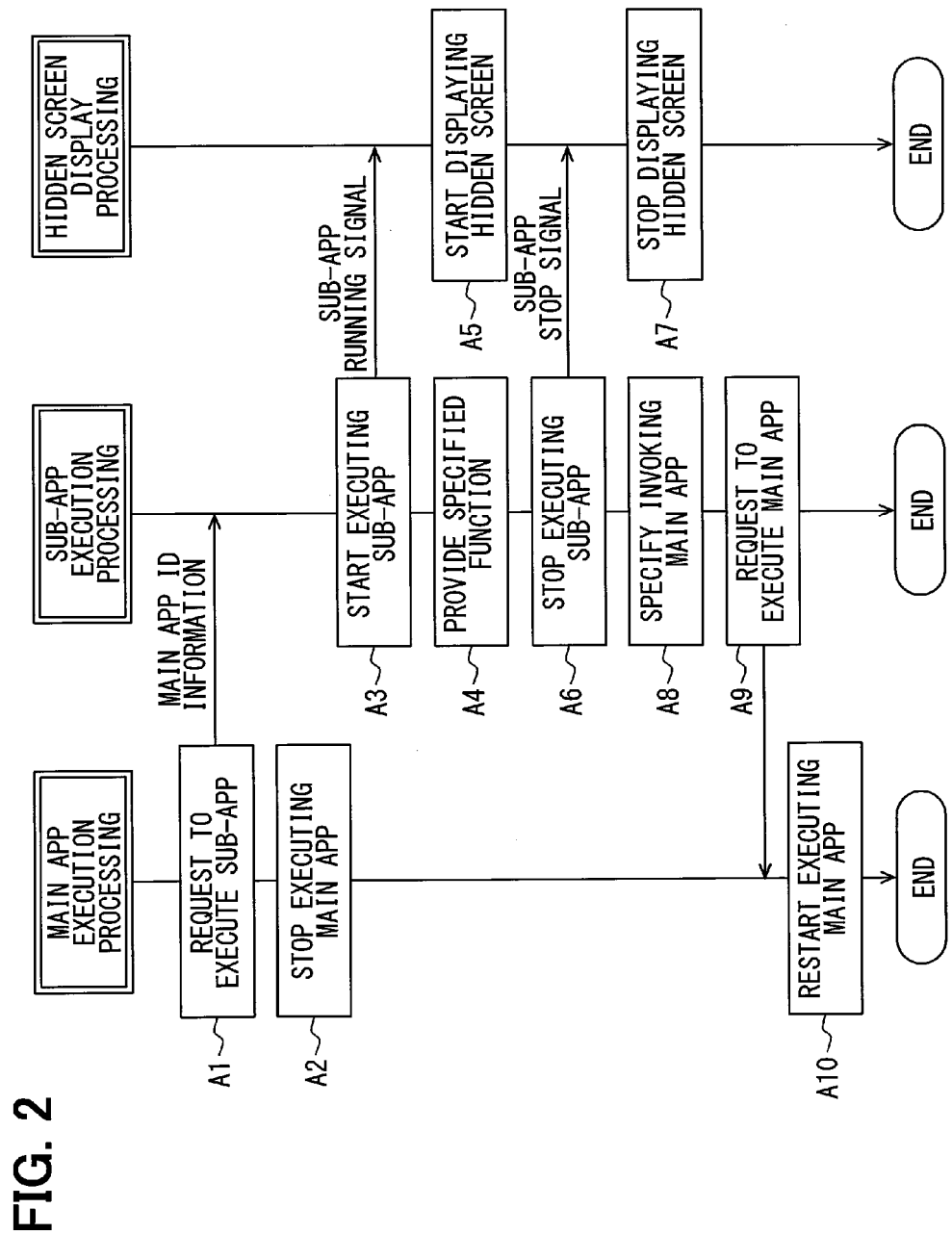
FIG. 2 is a flowchart illustrating operation of the information processing terminal.

The following describes operation of the information processing terminal 10. For example, suppose that the information processing terminal 10 executes main application A (hereinafter referred to as "main app A") and meanwhile provides a function not originally included in main app A by executing sub-application X (hereinafter referred to as "sub-app X") different from main app A. In such case, as illustrated in FIG. 2, the main execution processing portion 21 requests the sub-execution processing portion 22 to execute sub-app X (step A1). The main execution processing portion 21 invokes sub-app X. The main execution processing portion 21 outputs identification information about currently active main app A to the sub-execution processing portion 22. When completing the execution request for sub-app X, the main execution processing portion 21 pauses execution of main app A (step A2).

The sub-execution processing portion 22 starts executing sub-app X in response to the execution request from the main execution processing portion 21 (step A3). The sub-execution processing portion 22 executes sub-app X to provide a specified function included in sub-app X (step A4). When starting execution of sub-app X, the sub-execution processing portion 22 outputs a sub-app running signal to the hidden screen display processing portion 23. The sub-app running signal indicates that sub-app X is being executed. When receiving the sub-app running signal, the hidden screen display processing portion 23 starts displaying a hidden screen on the display output portion 13 (step A5).

The sub-execution processing portion 22 stops executing sub-app X when completing provision of the specified function (step A6). When stopping execution of sub-app X, the sub-execution processing portion 22 outputs a sub-app stop signal to the hidden screen display processing portion 23. The sub-app stop signal indicates that sub-app X stops. When receiving the sub-app stop signal, the hidden screen display processing portion 23 stops displaying the hidden screen on the display output portion 13 (step A7).

When stopping execution of sub-app X, the sub-execution processing portion 22 specifies the invoking main application or main app A in this case based on the identification information output from the main execution processing portion 21 (step A8). The main execution processing portion 21 requests the main execution processing portion 21 to execute specified main app A (step A9). The sub-execution processing portion 22 invokes paused main app A. The main execution processing portion 21 restarts paused main app A (step A10).

The following describes in more detail how the information processing terminal 10 executes the destination selection application as main app A and executes the position information provision application as sub-app X.

Figure 3:
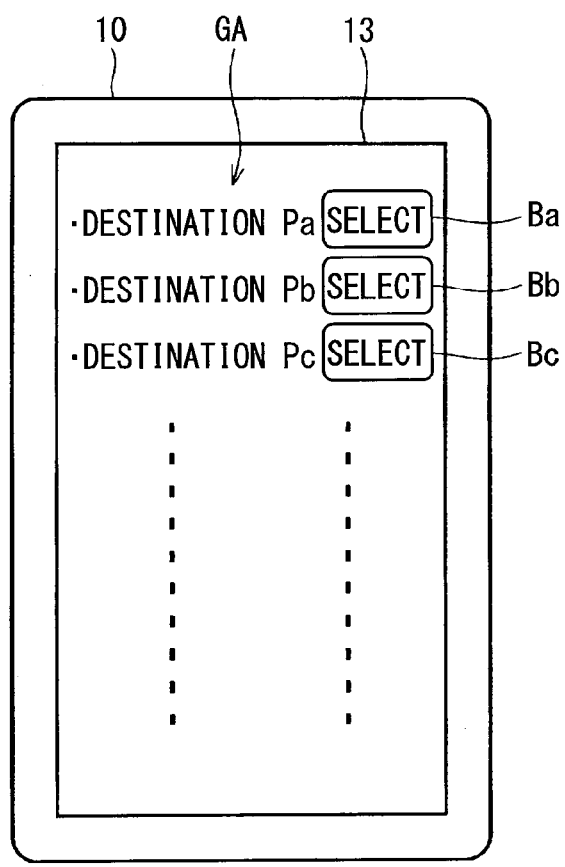
FIG. 3 is a diagram illustrating an execution screen for a main application.

As illustrated in FIG. 3, the information processing terminal 10 allows the display output portion 13 to display execution screen GA for destination selection application A (hereinafter referred to as "destination selection app A") when the main execution processing portion 21 executes destination selection app A. Execution screen GA displays destination candidates Pa, Pb, Pc, and so on and displays selection buttons Ba, Bb, Bc, and so on corresponding to the destination candidates in order to select destination candidates. The selection button is displayed as a touch button that enables a user to touch.

When the user manipulates any of the selection buttons, the sub-execution processing portion 22 starts executing position information provision app X (hereinafter referred to as "position information provision app X") according to an execution request from the main execution processing portion 21. The main execution processing portion 21 outputs destination candidate specification information to the sub-execution processing portion 22. The destination candidate specification information specifies a selected candidate. The sub-execution processing portion 22 specifies the selected candidate based on the destination candidate specification information output from the main execution processing portion 21 and extracts position information about the specified candidate from the map data. The sub-execution processing portion 22 supplies the extracted position information to the navigation system.

Figure 4:
FIG. 4 is a diagram illustrating an execution screen for a sub-application.

When the sub-execution processing portion 22 starts executing position information provision app X, the information processing terminal 10 originally allows the display output portion 13 to display execution screen GX as illustrated in FIG. 4, namely, the execution screen to indicate that position information provision app X is being executed, for example. In this case, however, the information processing terminal 10 allows the hidden screen display processing portion 23 to display a hidden screen instead of execution screen GX on the display output portion 13 in order to hide execution of position information provision app X.

With reference to FIG. 5, the following describes examples of the hidden screen displayed by the hidden screen display processing portion 23. In this case, the hidden screen display processing portion 23 displays any one of hidden screens GHa through GHd as illustrated in FIG. 5.

Hidden screen GHa illustrated in FIG. 5 is a so-called dummy screen that is transparent in the entire area. While hidden screen GHa is displayed, the user can view execution screen GA for destination selection app A through hidden screen GHa but cannot manipulate execution screen GA. Hidden screen GHa need not be entirely transparent but may be partly transparent including the remaining opaque part of the screen.

Hidden screen GHb illustrated in FIG. 5 is entirely monochromic. While hidden screen GHb is displayed, the user cannot view or manipulate execution screen GA through hidden screen GHb. Hidden screen GHb need not be entirely monochromic but may be partly monochromic including the remaining transparent part of the screen, for example. The single color may be black or white or may be otherwise.

Hidden screen GHc illustrated in FIG. 5 entirely contains a specified pattern. While hidden screen GHc is displayed, the user cannot view or manipulate execution screen GA through hidden screen GHc. Hidden screen GHc need not entirely contain the specified pattern but may be partly patterned including the remaining transparent part of the screen, for example. The specified pattern may be stripes, for example, but may be otherwise.

Hidden screen GHd illustrated in FIG. 5 is specified by the main execution processing portion 21. In this case, the main execution processing portion 21 selects a screen to be displayed according to the type of a main application to be executed. The main execution processing portion 21 specifies a screen on the hidden screen display processing portion 23 when the main execution processing portion 21 requests execution of position information provision app X, for example. The hidden screen display processing portion 23 extracts data to display the screen specified by the main execution processing portion 21 from the storage portion 14 and displays the specified screen based on the extracted data for screen display.

While hidden screen GHd is displayed, the user cannot view or manipulate execution screen GA through hidden screen GHd. Hidden screen GHd need not entirely contain the specified screen but may partly contain the specified screen including the remaining transparent part of the screen, for example. Various specified screens may be available such as a screen containing a symbol mark representing the main application executed by the main execution processing portion 21 and a screen containing a symbol mark representing a category of destinations the main application can select. The specified screen may contain a symbol unassociated with the main application.

As described above, the information processing terminal 10 according to the embodiment executes a sub-application different from the main application to provide a function not originally included in the main application and meanwhile displays a hidden screen to prevent the user from recognizing that the sub-application is active. The information processing terminal 10 can provide a function not originally included in the main application and concurrently hide that the sub-application to provide the function is active. The information processing terminal 10 can provide the function as if the function were included in the main application. The information processing terminal 10 can give the appearance of directly installing the sub-application function in the main application.

In the above-mentioned example, the main execution processing portion 21 executes destination selection app A as the main application. The sub-execution processing portion 22 executes position information provision app X as the sub-application. However, the main application executed by the main execution processing portion 21 and the sub-application executed by the sub-execution processing portion 22 are not limited thereto but may include various applications to be executed. In this case, the main application and the sub-application are not limited to destination selection app A and position information provision app X, namely, applications that are associated with each other based on the concept of "position." These applications may be unassociated with each other.

As a hidden screen, the hidden screen display processing portion 23 displays one of the transparent screen, the monochromic screen, the specifically patterned screen, the specified screen specified by the main execution processing portion 21. However, the hidden screen displayed by the hidden screen display processing portion 23 is not limited thereto. Various screens are available as the hidden screen if the screen can hide execution of the sub-application.

The sub-application invoked from the main application may be previously registered to a data table or may be selected as needed when invoked. The sub-application invoked from the main application may be invoked from an application other than the main application.

Second Embodiment

The second embodiment of the present disclosure will be described. As illustrated in FIG. 6, the information processing terminal 10 allows the control portion 11 to execute a control program and thereby virtually implement a recognition processing portion 24 as software. The recognition processing portion 24 may be implemented as a hardware circuit integrated with the control portion 11, for example.

The recognition processing portion 24 corresponds to an example of an authentication portion and means. When the sub-execution processing portion 22 receives an execution request for the sub-application from the main execution processing portion 21, the recognition processing portion 24 determines whether or not the main application executed by the main execution processing portion 21 is a predetermined authenticated application to be described later in detail.

Each application (application program) stored in the storage portion 14 is supplied with identification information and contains a password needed to execute the application. To execute an application as the main application, the main execution processing portion 21 starts executing the application under the condition that a valid password (assigned to the application) is entered to an unshown password input portion displayed on the display output portion 13.

The storage portion 14 stores authentication data ND as illustrated in FIG. 7, for example. Authentication data ND contains authentication information supplied to each application and a password assigned to each application associated with each other.

Figure 8:
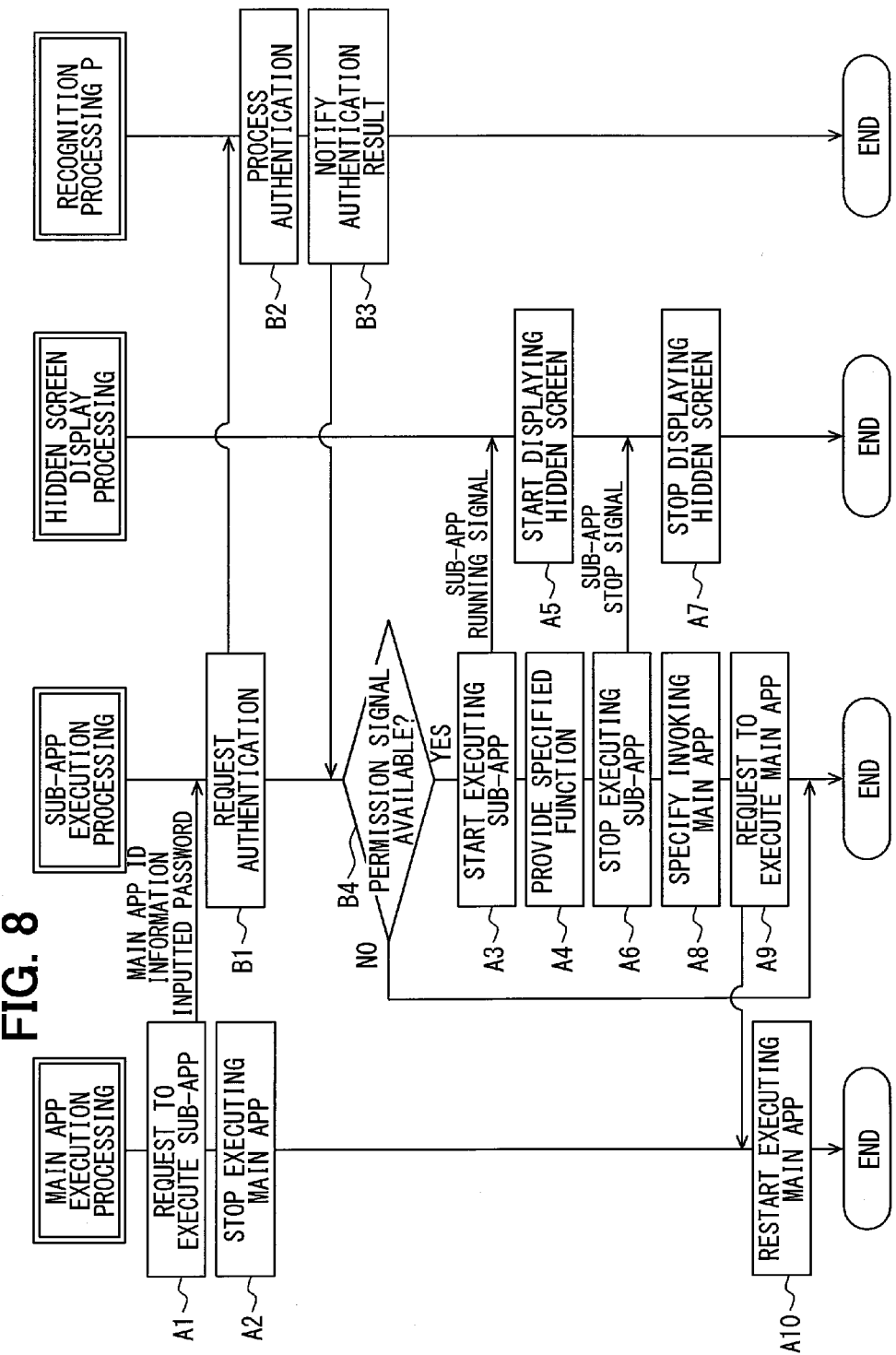
FIG. 8 is a flowchart illustrating operation of the information processing terminal according to the second embodiment.

The following describes operation of the information processing terminal 10. As illustrated in FIG. 8, the main execution processing portion 21 requests the sub-execution processing portion 22 to execute sub-app X (step A1). The main execution processing portion 21 outputs the identification information about active main app A and the password entered to execute main app A to the sub-execution processing portion 22. The sub-execution processing portion 22 executes an authentication request in response to the execution request from the main execution processing portion 21 (step B1). During the authentication request, the sub-execution processing portion 22 outputs the identification information and the password received from the main execution processing portion 21 to the recognition processing portion 24.

The recognition processing portion 24 performs an authentication process in response to the authentication request from the sub-execution processing portion 22 (step B2). During the authentication process, the recognition processing portion 24 determines whether or not the set of the authentication information and the password output from the sub-execution processing portion 22, namely, output from the main execution processing portion 21, conforms to a set of any authentication information and password stored in authentication data ND.

When completing the authentication process, the recognition processing portion 24 outputs authentication result information to the sub-execution processing portion 22 (step B3). The authentication result information indicates the result of the authentication process. The recognition processing portion 24 may determine conformity to a set of any authentication information and password during the authentication process. In this case, the recognition processing portion 24 determines that the main application executed by the main execution processing portion 21 corresponds to the predetermined authenticated application. The recognition processing portion 24 attaches a permission signal to the authentication result information. On the other hand, the recognition processing portion 24 may determine no conformity to a set of any authentication information and password during the authentication process. In this case, the recognition processing portion 24 determines that the main application executed by the main execution processing portion 21 does not correspond to the predetermined authenticated application. The recognition processing portion 24 attaches a prohibition signal to the authentication result information.

When the recognition processing portion 24 outputs the authentication result information, the sub-execution processing portion 22 determines whether or not the permission signal is attached to the authentication result information (step B4). When the permission signal is attached to the authentication result information (step B4: YES), the sub-execution processing portion 22 starts executing sub-app X (step A3). When staring executing sub-app X, the sub-execution processing portion 22 outputs the sub-app running signal to the hidden screen display processing portion 23. The hidden screen display processing portion 23 receives this signal and displays the hidden screen. In this case, the hidden screen display processing portion 23 displays the hidden screen during execution of sub-app X under the condition that the application executed by the main execution processing portion 21 corresponds to the predetermined authenticated application.

On the other hand, the permission signal may not be attached to the authentication result information, namely, the prohibition signal may be attached to the authentication result information (step B4: NO). In this case, the sub-execution processing portion 22 terminates the process without executing sub-app X. The sub-execution processing portion 22 may execute sub-app X without allowing the hidden screen display processing portion 23 to display the hidden screen if no permission signal is attached to the authentication result information. When starting executing sub-app X, the sub-execution processing portion 22 may not output the sub-app running signal to the hidden screen display processing portion 23, for example. In this manner, the sub-execution processing portion 22 may execute sub-app X without displaying the hidden screen. In this case, the display output portion 13 displays execution screen GX.

As described above, the information processing terminal 10 according to the embodiment displays the hidden screen during execution of sub-app X only when the application executed by the main execution processing portion 21 corresponds to the predetermined authenticated application. In other words, the information processing terminal 10 displays the execution screen for sub-app X during execution of sub-app X when the application executed by the main execution processing portion 21 does not correspond to the predetermined authenticated application. This enables to give the appearance of allowing the authenticated application to include the function of sub-app X and give the appearance of allowing an application other than the authenticated application to exclude the function of sub-app X.

Figure 9:
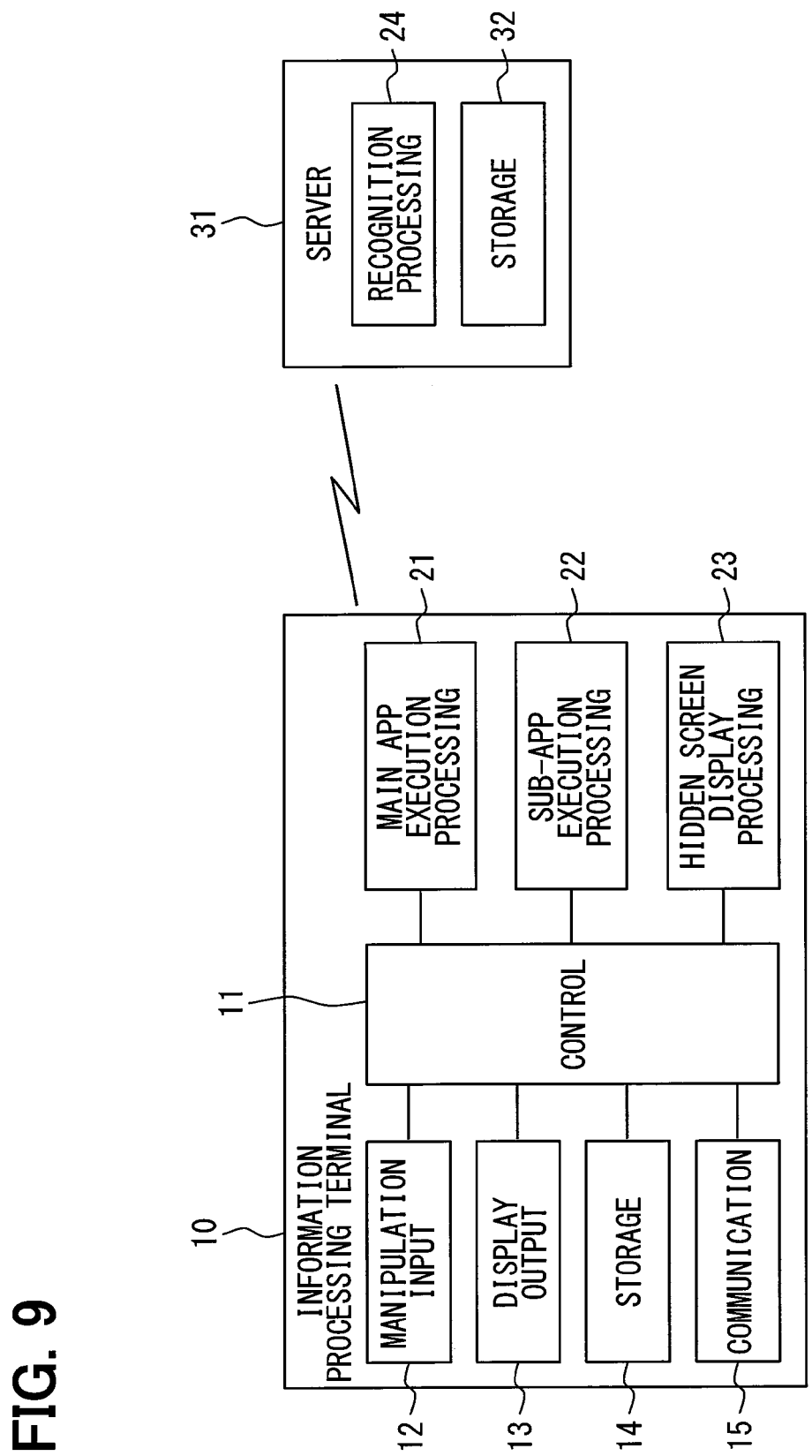
FIG. 9 is a function block diagram schematically illustrating a configuration of an information processing terminal according to a modification.

As illustrated in FIG. 9, the recognition processing portion 24 may be provided for an external server 31 communicable with the information processing terminal 10, not for the information processing terminal 10. In this case, authentication data ND may also be stored in a storage portion 32 of the server 31. The server 31 can manage authentication data ND and the authentication process in an integrated fashion. For example, updating authentication data ND in the server 31 can change the authenticated application. This eliminates the need to update each authentication data ND stored in the several information processing terminals.

While there have been illustrated the embodiments according to the present disclosure, embodiments according to the present disclosure are not limited to the above-illustrated embodiments. The scope of embodiments and configurations according to the present disclosure also includes embodiments and configurations resulting from appropriately combining technical elements disclosed in different embodiments and configurations.

What is claimed is:

1. An information processing terminal comprising:
a computer;
a display screen;
a manipulation portion configured to receive manual manipulation from a user;
an application execution portion of the information processing terminal that executes an application;
a sub-application execution portion of the information processing terminal that executes a sub-application in response to an execution request from the application execution portion, the sub-application being configured to provide a specified function for the application executed by the application execution portion; and
a hidden screen display portion of the information processing terminal that, instead of displaying an execution screen on the display screen indicating execution of the sub-application, displays a hidden screen on the display screen hiding the execution of the sub-application while the sub-application execution portion is executing the sub-application, wherein
the application execution portion executes, as the application, a destination selection application that selects a destination,
the sub-application execution portion executes, as the sub-application, a position information provision application that supplies an external navigation system with position information about the destination selected by the destination selection application,
in response to the user's manipulation on the manipulation input portion to specify the execution of the position information provision application while the destination selection application is in execution,
the application execution portion stops executing the destination selection application and the sub-application execution portion starts executing the position information provision application and the hidden screen display portion displays on the display screen the hidden screen hiding the execution of the position information provision application; and
in response to completion of supply of the position information to the external navigation system,
the sub-execution processing portion stops executing the position information provision application and the hidden screen display portion stop displaying the hidden screen on the display screen and the application execution portion restarts executing the destination selection application.

2. The information processing terminal according to claim 1,
wherein the hidden screen display portion displays on the display screen, as the hidden screen, any one of a transparent screen, a monochromic screen, a specifically patterned screen, and a screen specified by the application execution portion.

3. The information processing terminal according to claim 1, further comprising:
an authentication portion that determines whether or not the application executed by the application execution portion is a predetermined authenticated application when the sub-application execution portion receives the execution request from the application execution portion,
wherein the hidden screen display portion displays on the display screen the hidden screen when the application executed by the application execution portion is the authenticated application.

4. The information processing terminal according to claim 1,
wherein the application execution portion outputs an execution request for the sub-application to the sub-application execution portion and subsequently stops executing the application, and
wherein, when completing provision of a specified function by executing the sub-application, the sub-application execution portion stops the hidden screen display portion from displaying the hidden screen on the display screen and allows the application execution portion to restart the stopped application.

* * * * *